(12) United States Patent
Lowry

(10) Patent No.: US 10,936,839 B2
(45) Date of Patent: Mar. 2, 2021

(54) PRODUCT IDENTIFICATION SYSTEM

(71) Applicant: The Procter & Gamble Company, Cincinnati, OH (US)

(72) Inventor: Michelle Peta Lowry, Norwood, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/427,554

(22) Filed: May 31, 2019

(65) Prior Publication Data

US 2020/0380230 A1 Dec. 3, 2020

(51) Int. Cl.
*G06Q 30/00* (2012.01)
*G06Q 90/00* (2006.01)
*G06K 7/10* (2006.01)
*G06K 7/14* (2006.01)

(52) U.S. Cl.
CPC ......... *G06K 7/1456* (2013.01); *G06K 7/1413* (2013.01); *G06K 7/1417* (2013.01)

(58) Field of Classification Search
USPC ................ 235/383, 385, 462.01, 494, 462.1
See application file for complete search history.

(56) References Cited

U.S. PATENT DOCUMENTS

| | | | | |
|---|---|---|---|---|
| 4,625,101 A * | 11/1986 | Hinks | ............... | G06K 19/06028 152/523 |
| 5,971,276 A * | 10/1999 | Sano | .................. | G06K 7/12 235/462.01 |
| 9,727,811 B2 | 8/2017 | Osborne | | |
| 9,731,856 B1 * | 8/2017 | Houlihan | ................... | B65C 9/46 |
| 2004/0137729 A1 * | 7/2004 | Norman | ............... | B81C 99/0085 438/689 |
| 2005/0090931 A1 * | 4/2005 | Glynn | .................... | G06Q 30/06 700/215 |
| 2006/0226099 A1 * | 10/2006 | Reid | ......................... | G09F 3/20 211/113 |
| 2013/0212046 A1 * | 8/2013 | Henshue | ............... | E01C 11/222 705/500 |
| 2014/0324642 A1 * | 10/2014 | Winkel | ................ | G06Q 10/087 705/28 |
| 2016/0055361 A1 * | 2/2016 | Lai | .................... | G06K 7/10732 235/462.06 |
| 2016/0094548 A1 * | 3/2016 | Lee | ........................ | H04W 12/04 713/186 |
| 2016/0260001 A1 * | 9/2016 | Flores | .................... | B29C 64/386 |
| 2017/0046548 A1 * | 2/2017 | Kamijo | .................. | G06K 1/121 |
| 2018/0088586 A1 | 3/2018 | Hance | | |
| 2018/0121775 A1 * | 5/2018 | Sharma | ............ | G06K 19/06159 |

* cited by examiner

*Primary Examiner* — Tuyen K Vo
(74) *Attorney, Agent, or Firm* — John G. Powell

(57) ABSTRACT

A product identification system that reduces operator error related to scanning an incorrect barcode. The product identification system includes a generally planar substrate with a barcode disposed thereon. The substrate includes a raised section that extends out of the plane of the substrate with a portion of the barcode being disposed on the raised section such that the barcode is detectable only when a detector is properly positioned relative to the barcode. The product identification system can be used in a warehouse environment to prevent warehouse workers from scanning nearby barcodes by mistake.

15 Claims, 7 Drawing Sheets

PRODUCT IDENTIFICATION SYSTEM

FIELD

The present disclosure is directed generally to a configuration for a product identification system that reduces inventory error. More specifically, the present disclosure is directed to a product identification system in a warehouse environment that reduces operator error related to detecting a barcode associated with a product or product storage location in the warehouse.

BACKGROUND

Barcode-type product identification systems are one of the most widely used product identification systems in the world. Barcodes generally come in one of two forms, 1D or 2D. A 1D barcode represents data as a series of parallel lines (or "bars") having varying widths and spacing. A well-known example of a 1D barcode is a universal product code ("UPC"), which is commonly used to associate a particular good with a numeric identifier. More recently, barcodes have evolved to represent data using a two-dimensional geometric pattern, which uses of a variety of symbols other than bars. Such barcodes are sometimes referred to as 2D barcodes and include the well-known quick response ("QR") codes. Barcodes are typically printed onto a suitable substrate such as product packaging, a label, or other material that enables detection by a barcode scanner, camera, or other barcode detection device.

Large scale manufacturing operations commonly use warehouses to provide a centralized location for the storage and distribution of goods. In some instances, multiple inventory objects (e.g., boxes, packages, and/or cases) are arranged in aisles or on shelves and have barcodes positioned on or near the storage location of the inventory object ("storage-location barcodes") and/or on the inventory object itself ("product barcodes"). The barcodes encode data used to identify and track the inventory objects in the warehouse. Human operators and/or robotic devices (e.g., autonomous guided vehicles such as pallet jacks, fork truck, and loader/unloaders) move throughout the warehouse to perform actions related to the storage and/or shipment of goods. And when a product is deposited or removed from a storage location, the human operator or robotic device will typically scan a barcode associated with the product to determine whether the location and/or product(s) stored in that correction are correct.

Warehouses are generally configured to accommodate goods in an organized fashion, for example, arranged on standard-sized pallets in one more aisles or shelves. In such a configuration, it is not uncommon to position a storage-location barcode in or near the aisle (e.g., handing above the aisle from the ceiling or a rafter) such that the barcode can be conveniently scanned by an operator. In some instances, the storage-location barcodes may be centered above an aisle such that they are only 40 to 50 inches apart. Due to the close proximity of the storage-location barcodes to one another, when an operator attempts to scan a storage-location barcode, they may inadvertently scan the barcode of an adjacent aisle. Consequently, the inventory tracking system for the warehouse will register the product as being deposited or removed from the wrong location, which can lead to "lost inventory" and/or the incorrect product being sent to a customer.

Accordingly, it would be desirable to provide a product identification system that reduces the likelihood of an operator scanning the wrong barcode.

SUMMARY

The present disclosure relates to a product identification system comprising a substrate and barcode disposed on a raised section of the substrate. The substrate includes a planar section having a height and width that generally define a plane and a raised section that extends out of the plane defined by the height and width dimensions. A portion of the barcode is disposed on the raised section of the substrate such that the barcode is detectable only when a barcode detector is properly positioned relative to the centerline of the product identification system. The product identification system reduces operator error related to scanning a barcode by exploiting the novel characteristics of the product identification system described herein.

DETAILED DESCRIPTION

Figure 1A:
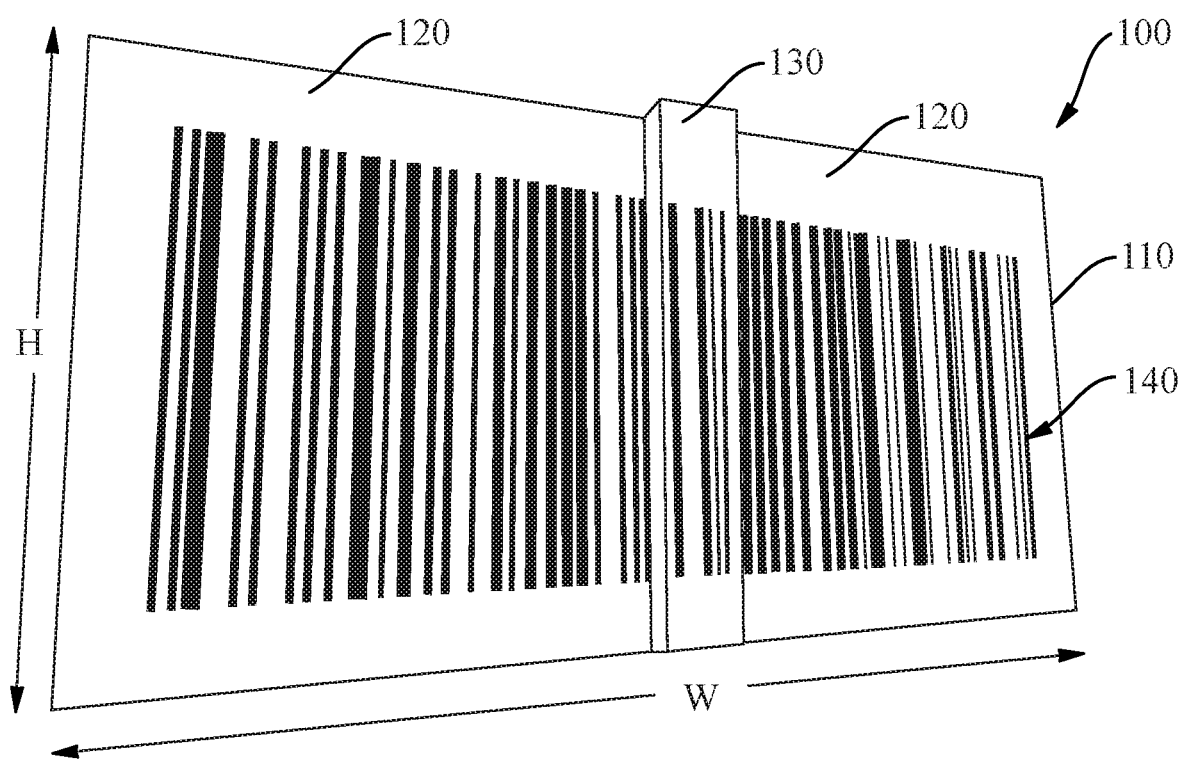
FIG. 1A is a perspective view of a 1D barcode with a vertical raised section.

Inventory loss and improper customer order fulfillment have long plagued warehouse operations, especially when it results from scanning an incorrect barcode. It has now been surprisingly discovered that configuring a barcode to include a raised section can significantly reduce the likelihood that an operator will scan an incorrect barcode.

Reference within the specification to "embodiment(s)" or the like means that a particular material, feature, structure and/or characteristic described in connection with the embodiment is included in at least one embodiment, optionally a number of embodiments, but it does not mean that all embodiments incorporate the material, feature, structure, and/or characteristic described. Furthermore, materials, features, structures and/or characteristics may be combined in any suitable manner across different embodiments, and materials, features, structures and/or characteristics may be omitted or substituted from what is described. Thus, embodiments and aspects described herein may comprise or be combinable with elements or components of other embodiments and/or aspects despite not being expressly exemplified in combination, unless otherwise stated or an incompatibility is stated.

In all embodiments, numeric ranges are inclusive of narrower ranges; delineated upper and lower range limits are interchangeable to create further ranges not explicitly delineated. Embodiments of the present invention can comprise, consist essentially of, or consist of, the essential components as well as optional elements described herein. As used herein, "consisting essentially of" means that the system, device or component may include additional elements, but only if the additional elements do not materially alter the basic and novel characteristics of the claimed system, device, or component. As used in the description and the appended claims, the singular forms "a," "an," and "the" are intended to include the plural forms as well, unless the context clearly indicates otherwise.

Product Identification System

The product identification system described herein is suitable for use in a warehouse environment and includes a barcode disposed on a substrate. As used herein, "barcode" refers to a visual, machine-readable representation of data. A barcode herein may be in the form of a 1D barcodes (e.g., universal product code) or a 2D barcodes (e.g., QR code). The substrate upon which the barcode is disposed may be formed from any suitable material known in the art (e.g., paper, plastic, metal). The barcode may be applied to the substrate using conventional methods (e.g., analog or digital printing). The product identification system may be positioned in a warehouse such that an operator (human or robotic) can detect the barcode with a suitable barcode detection device (e.g., barcode scanner or camera) when performing actions related to the storage and/or shipment of products. For example, the product identification system may be positioned 1.5 to 13 meters above an aisle (e.g., 2-10 m, 3-8 m, or even 4-7 m above the floor) and centered between the sides of the aisle. The barcode may be positioned at an angle of 0° to 70° from vertical to facilitate detection by an operator. Of course, it is to be appreciated that the product identification system may be positioned elsewhere in or near the aisle as long as the barcode can be conveniently and accurately detected by an operator at a distance of, for example, between 1 m and 35 m, 3 m and 30 m, or even between 5 m and 25 m.

Figure 1B:
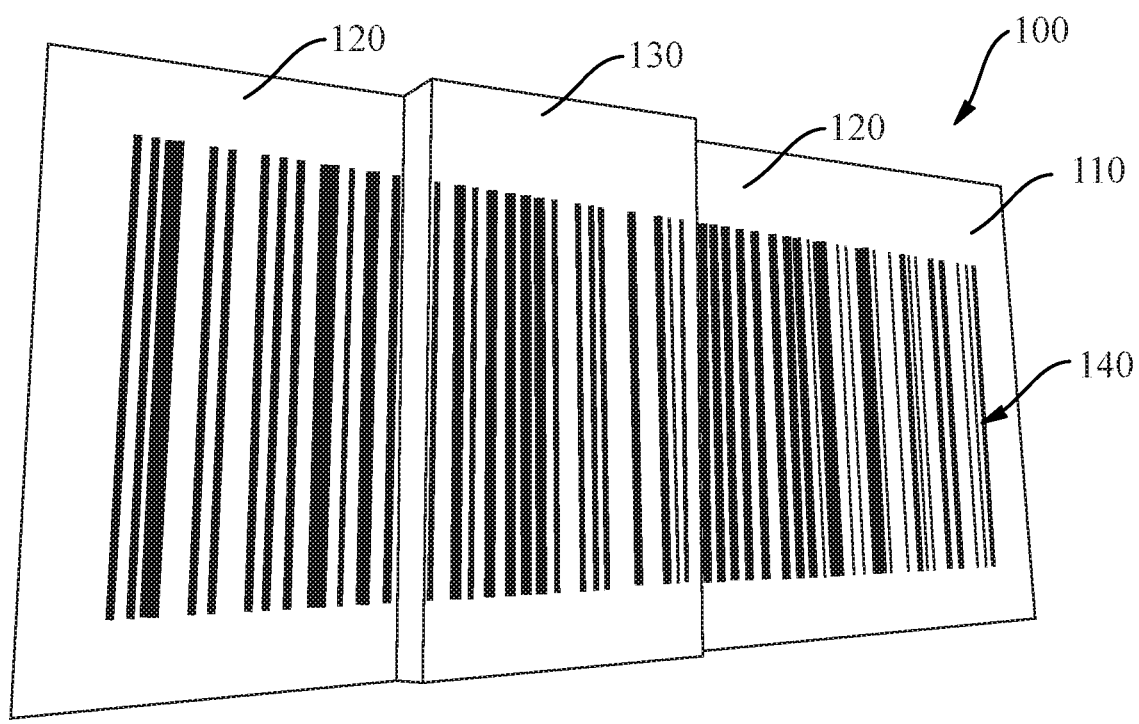
FIG. 1B is a perspective view of a 1D barcode with a vertical raised section.
Figure 1C:
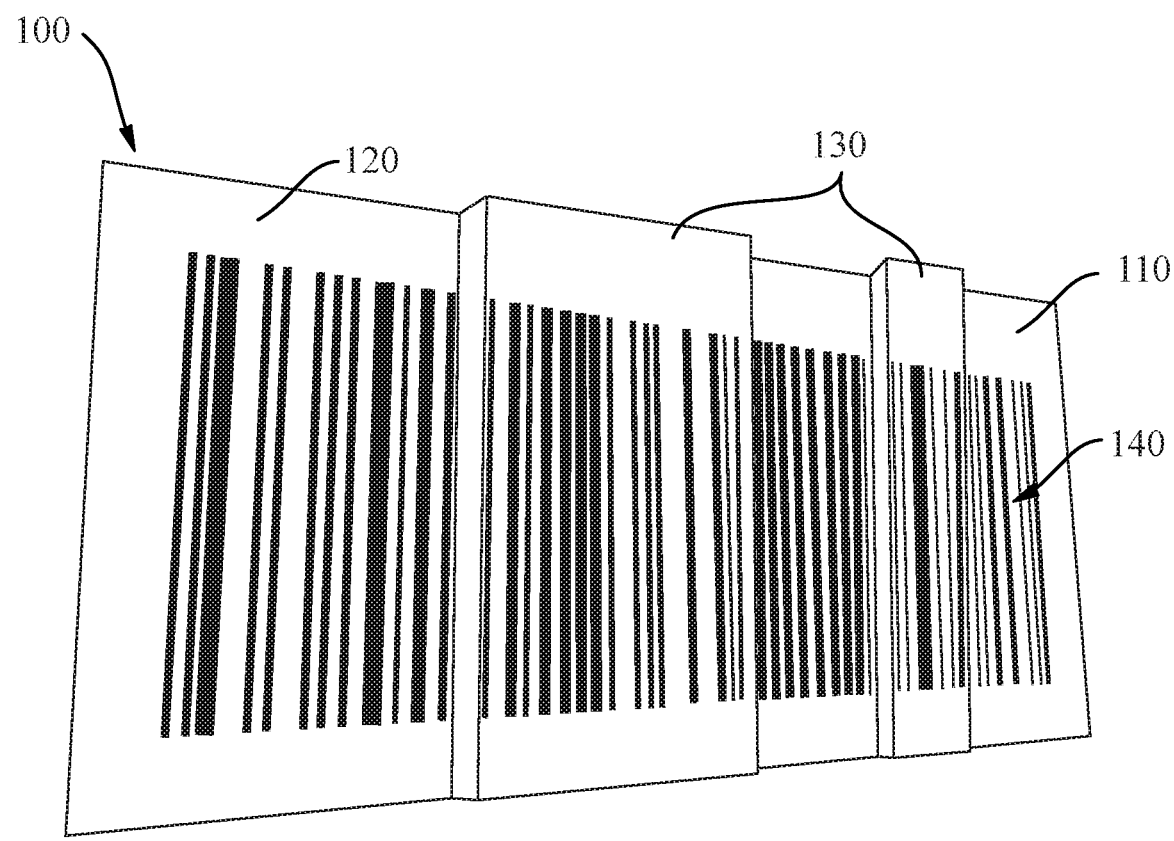
FIG. 1C is a perspective view of a 1D barcode with two vertical raised sections.

The substrate of the product identification system is generally planar, except for the raised section(s) discussed in more detail below, and the barcode is disposed on one or both of the major faces of the planar substrate. As used herein, "disposed" means an element is positioned in a particular place relative to another element. The substrate may be any size that is suitable for use as a storage-location barcode in a warehouse environment. For example, the substrate may have a length of 15 to 90 cm (e.g., 20-75 cm, 25-60 cm, or even 30-45 cm) and a height of 2.5 to 30 cm (e.g., 4 to 25 cm or 10 to 20 cm). The substrate has at least one raised section that extends outwardly from the plane generally defined by the substrate. The raised section of the substrate may have a width of 1 to 80 cm (e.g., 2 to 50 cm, 3 to 20 cm, or even 4 to 10 cm), a length that is coextensive with the height of the substrate (e.g., as shown in FIGS. 1A, 1B, and 1C), and may extend outwardly from the plane of the substrate 1 to 10 cm. In some instances, the substrate may include more than 1 raised section (e.g., 2, 3, 4, 5, 6, 7, or more), which have the same or different dimensions. The raised section may be configured to have a longest dimension that is parallel, transverse or diagonal to the height dimension of the substrate.

In the present product identification system, a portion of the barcode is disposed on the raised section(s) of the substrate. The portion of the barcode that is disposed on the raised section is not particularly limited and may range from 1% to 99% of the total barcode area. When using a 1D barcode formed from a series of bars, such as those exemplified in the FIGS. 1A to 1E, the raised section may contain one or more bars and/or spaces between bars. However, it may be desirable to avoid "splitting" a bar between the raised section and the planar section of substrate such that a portion of a single bar is disposed on each section, as this can make it more difficult for certain detectors to detect the barcode. In some instances, the portion of a 1D barcode disposed on the raised section may include only the space between two adjacent bars.

The raised section of the substrate is configured (i.e., sized and positioned) to prevent detection of a barcode associated with an adjacent or nearby aisle or with a product that is not the intended target for detection. In some instances, the raised section of the substrate may prevent an operator from detecting the barcode at an angle of greater than 45° from the center of the product identification system. In this way, an operator who is storing or removing a product from an aisle will be less likely to detect a storage-location barcode associated with an adjacent or nearby aisle.

Figure 1E:
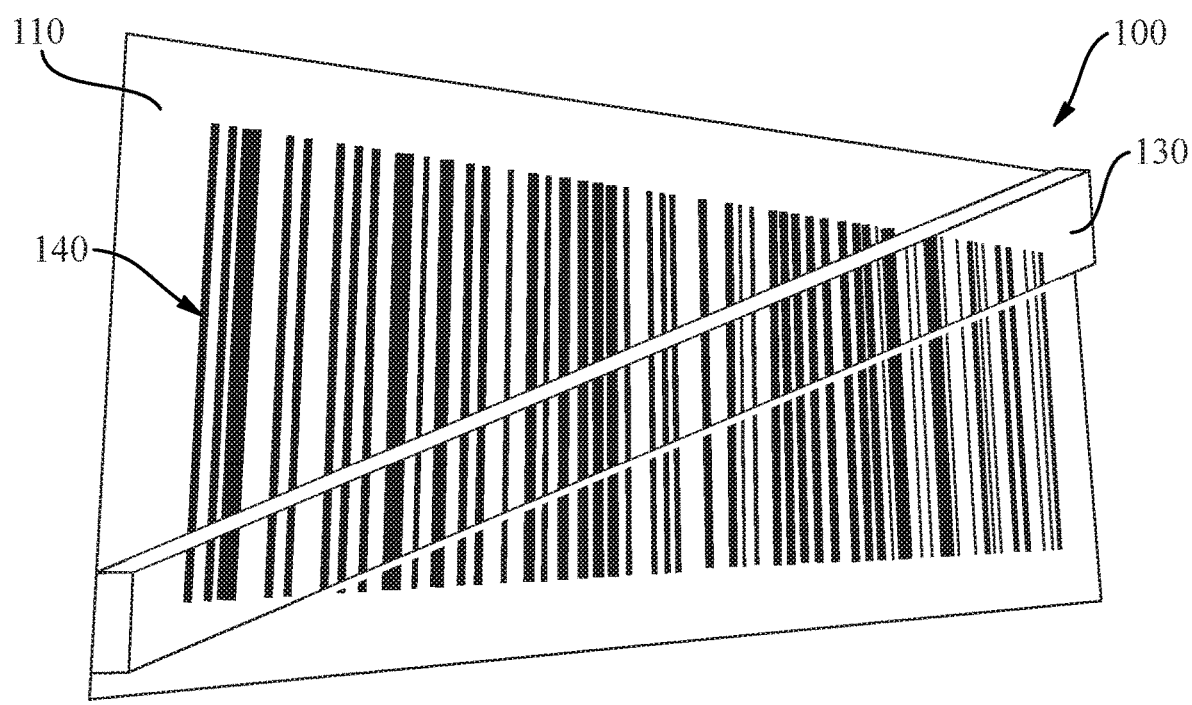
FIG. 1E is a perspective view of a 1D barcode with a diagonal raised section.
Figure 1F:
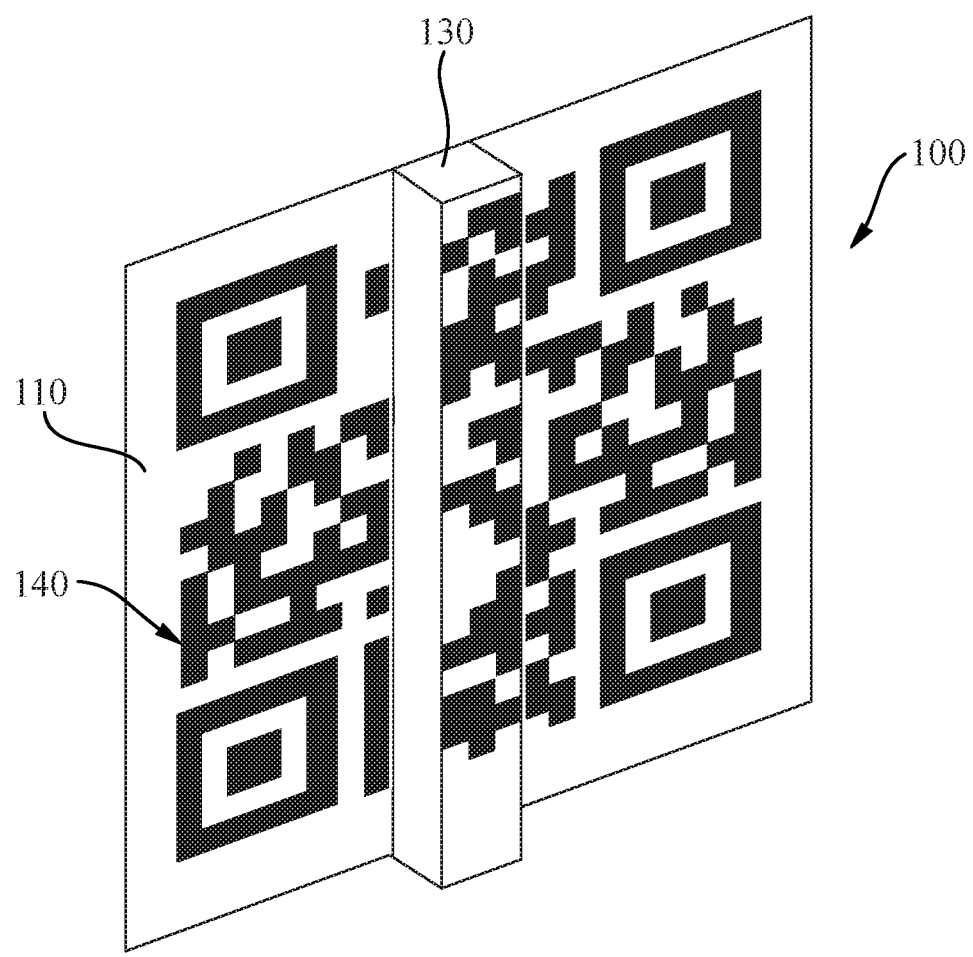
FIG. 1F is a perspective view of a 2D barcode with a raised section.

FIGS. 1A to 1F illustrate examples of a product identification system 100. Each product identification system includes a substrate 110 comprising a planer section 120 and one or more raised sections 130 extending out of the planar section 120. A portion of a barcode 140 is disposed on each of the planar section 120 and raised section 130 of the substrate 110. The planar section 120 of the substrate 110 is generally defined by a height dimension H and a width dimension W. The barcode may be a 1D barcode, as depicted in FIGS. 1A to 1E, or a 2D barcode 140, as depicted in FIG. 1F. FIGS. 1A to 1C illustrate examples of a product identification system in which the raised section 130 is configured to have a longest dimension that is parallel to the bars of the barcode 140 and is extensive with the substrate 110 in the H dimension. FIG. 1E illustrates an example of a product identification system 100 in which the raised section 130 is configured to have a longest dimension that is diagonal to the bars of the barcode 140 and coextensive with the substrate 110 in the W direction. While FIGS. 1A to 1F illustrate examples of the product identification system 100 in which the raised section 130 is coextensive with the substrate 110 in at least one dimension, it need not necessarily be so.

Figure 2:
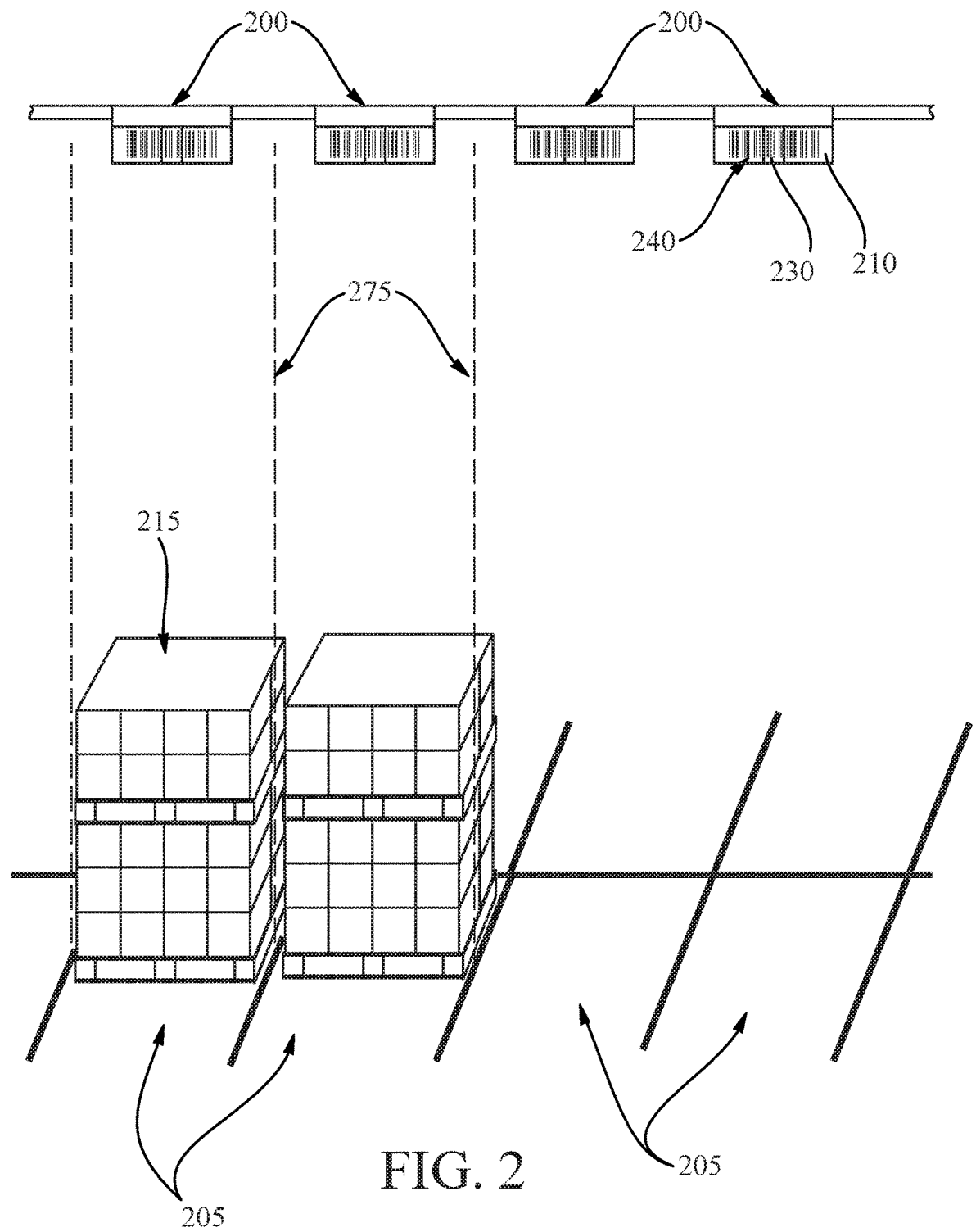
FIG. 2 illustrates an example of a warehouse environment utilizing the present product identification system.

FIG. 2 illustrates an example of the product identification system 200 in a warehouse environment. The warehouse environment illustrated in FIG. 2 includes a plurality of aisles 205 in which products 215 may be stored. The product identification system 200 includes a substrate 210 positioned above and, optionally, in the center of each aisle 205. The substrate includes a raised section 230 and a portion of a barcode 240 disposed thereon. Imaginary lines 275 are provided to illustrate the edge boundaries of the aisle 205. In this example, the raised section 230 of the product identification system 200 is configured such that an operator must be within the area bounded by the imaginary edge lines 275 (e.g., within 45° of the center of the product identification system) in order to detect the barcode 240 of the product identification system 200. Thus, the raised portion 230 of the substrate 210 prevents an operator who is performing an action in one aisle 205 from detecting the barcode 240 associated with an adjacent aisle 205.

EXAMPLE

Figure 3:
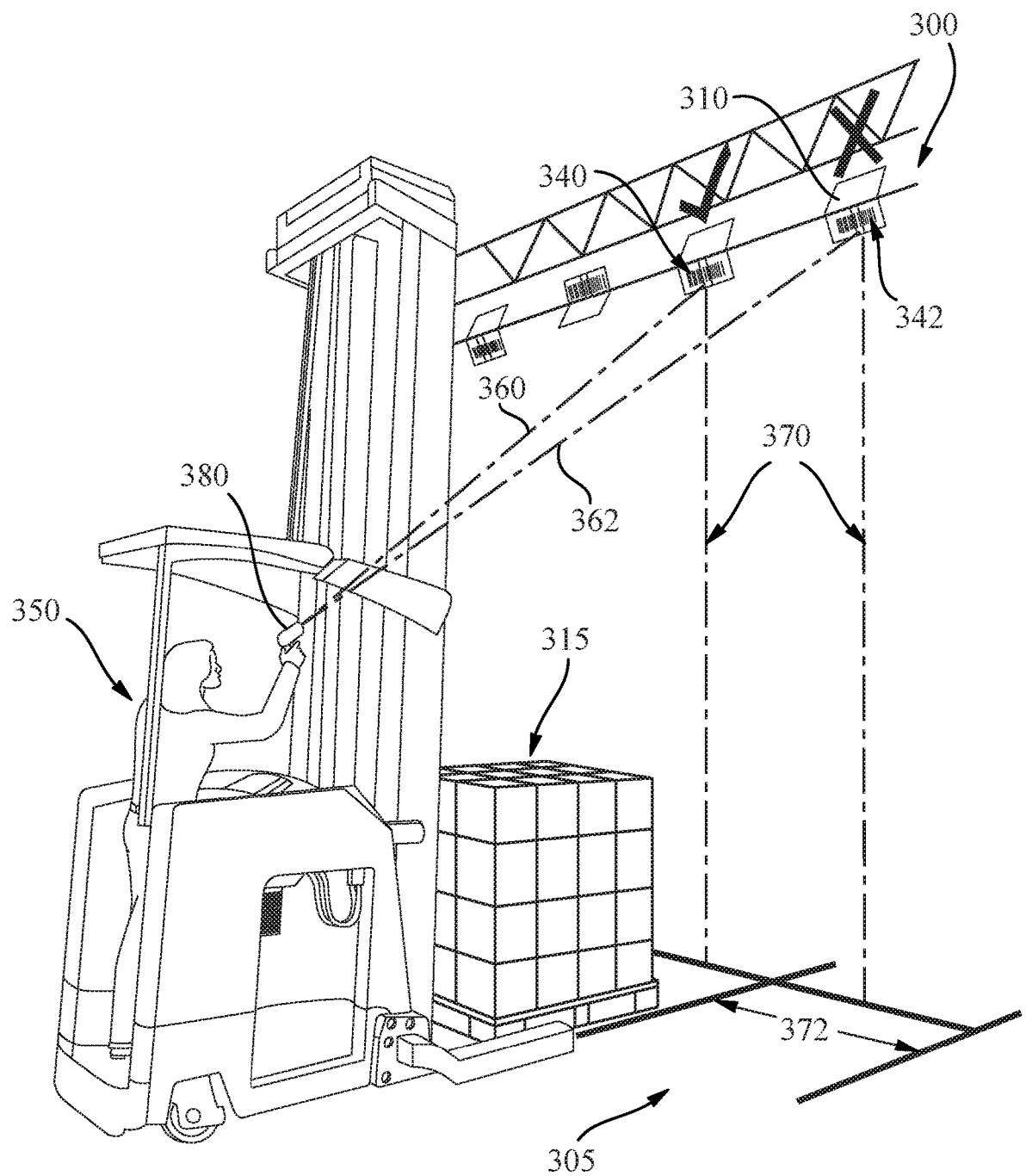
FIG. 3 illustrates an example of an operator detecting a barcode using the present product identification system.

FIG. 3 illustrates an example of the present product identification system 300 in a warehouse environment. The product identification system 300 includes a substrate 310 with a raised section and barcode 340 disposed thereon. A substrate 310 is positioned above each of a plurality of aisles 305. The substrate 310 may hang from a rafter or other portion of the warehouse ceiling and be positioned at a suitable angle relative to an operator 350. In this example, the substrates 310 are positioned in the center of each aisle 305, as indicated by imaginary centerlines 370, and titled at an angle of approximately 45° from vertical. As shown in FIG. 3, an operator 350 who is placing or removing a product 315 in an aisle 305 attempts to scan the barcode 340 associated with that aisle 305, as indicated by imaginary scan line 360. The product identification system 300 illustrated in FIG. 3 is configured such that if the operator 350 is within the edge lines 372 of an aisle 305, then they can detect the barcode 340 for that aisle 305 using a suitable barcode detection device 380. However, if the operator attempts to detect the adjacent barcode 342 (intentionally or otherwise), as indicated by imaginary scan line 362, the raised portion of the substrate 310 on the adjacent barcode 342 will prevent the operator from successfully scanning the adjacent barcode 342.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A product identification system for reducing operator error related to scanning a barcode, comprising:
    a substrate comprising a planar surface and a raised section that extends out of the planar surface of the substrate; and
    a 1D barcode or a 2D barcode disposed on the substrate, wherein a first portion of the barcode is disposed on the raised section and a second portion of the barcode is disposed on the planar surface, and wherein a barcode detector must be positioned between 0 and 45 degrees of a centerline of the product identification system to detect the barcode.

2. The product identification system of claim 1, wherein the barcode is a 1D barcode.

3. The product identification system of claim 1, wherein the raised section is coextensive with the planar surface of the substrate in at least one direction.

4. The product identification system of claim 1, wherein the raised section contains a larger portion of the barcode than the planar surface.

5. The product identification system of claim 1, wherein the substrate comprises two or more raised sections that each have a portion of the barcode disposed thereon.

6. The product identification system of claim 1, wherein the raised section extends about 1 cm to about 10 cm out of the planar surface.

7. The product identification system of claim 1, wherein the barcode comprises encoded data related to at least one of a product storage location and a product feature.

8. The product identification system of claim 1, wherein the substrate is positioned above an aisle comprising edges, and the detector must be positioned between the edges of the aisle to detect the barcode.

9. The product identification system of claim 1, further comprising a wall extending between the planar surface and a surface of the raised portion, wherein the wall is orthogonal to the planar surface and the surface of the raised portion and wherein the wall contains no portion of the barcode.

10. The product identification system of claim 1, wherein the barcode is printed onto at least one of the planar surface and the raised section.

11. A method of reducing operator error related to detecting a barcode, comprising:
    a) providing a product identification system that includes
        i) two or more substrates, wherein each substrate comprises a planar surface and a raised section that extends out of the planar surface of the substrate, and
        ii) a barcode disposed on each substrate, wherein a portion of each barcode is disposed on the raised section of each substrate; and
    b) detecting one of the barcodes with a barcode detector, wherein the barcode detector must be positioned between 0 and 45 degrees of a centerline of one of the barcodes to detect that barcode.

12. The method of claim 11, wherein the barcodes comprise encoded data related to at least one of a product storage location and a product feature.

13. The method of claim 11, wherein the product identification system is provided in a warehouse environment.

14. The method of claim 11, wherein the barcodes are detectable by the operator at a distance of about 1 meter to about 35 meters.

15. The method of claim 11, wherein the substrates are spatially separated from one another by a distance of about 1 meter to about 5 meters.

* * * * *